US010893179B2

(12) United States Patent
Tian et al.

(10) Patent No.: US 10,893,179 B2
(45) Date of Patent: Jan. 12, 2021

(54) COMBINED CAMERA

(71) Applicant: HANGZHOU HIKVISION DIGITAL TECHNOLOGY CO., LTD., Hangzhou (CN)

(72) Inventors: Wei Tian, Hangzhou (CN); Fuqiang Qi, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/343,174

(22) PCT Filed: May 23, 2017

(86) PCT No.: PCT/CN2017/085478
§ 371 (c)(1),
(2) Date: Apr. 18, 2019

(87) PCT Pub. No.: WO2018/076674
PCT Pub. Date: May 3, 2018

(65) Prior Publication Data
US 2019/0246019 A1 Aug. 8, 2019

(30) Foreign Application Priority Data
Oct. 24, 2016 (CN) .................... 2016 2 1156894 U

(51) Int. Cl.
*H04N 5/225* (2006.01)
*H04N 5/232* (2006.01)
(Continued)

(52) U.S. Cl.
CPC .......... *H04N 5/2254* (2013.01); *G03B 17/56* (2013.01); *H04N 5/225* (2013.01); *H04N 5/2252* (2013.01);
(Continued)

(58) Field of Classification Search
None
See application file for complete search history.

(56) References Cited

U.S. PATENT DOCUMENTS 6,268,882 B1 * 7/2001 Elberbaum ...... G08B 13/19619
348/143
2006/0028548 A1 * 2/2006 Salivar .................. H04N 7/185
348/143
(Continued)

FOREIGN PATENT DOCUMENTS

CN 206117836 4/1917
CN 206117837 4/1917
(Continued)

OTHER PUBLICATIONS

International Search Report and Written Opinion issued in International Patent Application No. PCT/CN2017/085478, dated Aug. 29, 2017.
(Continued)

*Primary Examiner* — James M Hannett
(74) *Attorney, Agent, or Firm* — Norton Rose Fulbright US LLP

(57) ABSTRACT

The present application provides a combined camera, comprising a first camera housing inside which a first camera is provided. One side of the first camera housing is provided with a rotating disc that is rotatable relative to the first camera housing; a rotating bracket is fixed on the rotating disc, a second camera housing that is rotatable relative to the rotating bracket is provided on the rotating bracket, and a second camera is provided within the second camera housing. Obviously, the second camera housing of the combined camera directly rotatably connected to the first camera housing through both the rotating disc and the rotating bracket, thereby eliminating the mounting bracket and the
(Continued)

base in the existing combined camera of a gun-ball linkage structure, thus simplifying the overall structure and reducing its height dimension.

12 Claims, 3 Drawing Sheets

(51) Int. Cl.
  *H04N 5/247* (2006.01)
  *G03B 17/56* (2006.01)
(52) U.S. Cl.
  CPC ......... *H04N 5/23299* (2018.08); *H04N 5/247* (2013.01)

(56) References Cited

U.S. PATENT DOCUMENTS

2007/0236570 A1* 10/2007 Sun ....................... G01S 3/7864
  348/159
2011/0310219 A1* 12/2011 Kim ....................... H04N 5/247
  348/36
2012/0257064 A1* 10/2012 Kim ................. G08B 13/19626
  348/159
2015/0304532 A1  10/2015 Bart et al.

FOREIGN PATENT DOCUMENTS

| CN | 201846413 | 5/2011 |
| CN | 202931456 | 5/2013 |
| CN | 204305176 | 4/2015 |
| CN | 204733286 | 10/2015 |
| WO | WO 2009/142332 | 11/2009 |
| WO | WO 2014/043974 | 3/2014 |

OTHER PUBLICATIONS

Extended Search Report issued in Corresponding European Patent Application No. 17866187.2, dated Jul. 10, 2019.

* cited by examiner

COMBINED CAMERA

The present application is a national phase under 35 U.S.C. § 371 of International Application No. PCT/CN2017/085478, filed May 23, 2017, which claims priority to Chinese Patent Application No. 201621156894.4, filed with China National Intellectual Property Administration on Oct. 24, 2016, entitled "Combined camera", each of which are incorporated herein by reference in their entirety.

TECHNICAL FIELD

The present application relates to the field of monitoring devices, and in particular, to a combined camera.

BACKGROUND

FIG. 1 is a schematic view showing the structure of a conventional combined camera of a gun-ball linkage structure.

The combined camera of a gun-ball linkage structure actually is integrated with a first camera 1 and a second camera 2 which are independent of each other through a mounting bracket 3. Wherein, the second camera 2 rotates in a horizontal plane and a vertical plane with respect to the first camera 1 under the action of the horizontal transmission structure and the vertical transmission structure.

It is conceivable that the combined camera of a gun-ball linkage structure is complicated and bulky due to the structure of the first camera 1 and the second camera 2 and the introduction of the auxiliary mounting bracket 3.

SUMMARY

The embodiments provide a combined camera that is simple in structure and small in height.

The combined camera includes a first camera housing inside which a first camera is provided, and one side of the first camera housing is provided with a rotating disc that is rotatable relative to the first camera housing; a rotating bracket is fixed on the rotating disc, a second camera housing that is rotatable relative to the rotating bracket is provided on the rotating bracket, and a second camera is provided within the second camera housing.

In one embodiment, it further includes a first motor and a second motor; the first motor is fixed within the first camera housing and is configured to drive the rotating disc to rotate relative to the first camera housing, the second motor is fixed within the second camera housing and is configured to drive the second camera housing to rotate relative to the rotating bracket.

In one embodiment, it further includes a main board, which is integrated with a power supply module, a pan/tilt head module and a core switching module, and is fixedly mounted within the first camera housing.

In one embodiment, it further includes a connecting wire, which is electrically connected to the main board at one end, and is extended, at the other end, through the first camera housing, the first rotating disc and into the second camera housing, and electrically connected to the second camera and the second motor.

In one embodiment, the first camera housing is a cylindrical housing extending in a first direction; the first camera, the first rotating disc and the first motor are sequentially arranged along a length direction of the first camera housing, and the main board is arranged along a length direction of the first camera housing.

In one embodiment, the first camera housing has a first waterproof sealing cavity, a first image collecting hole and a first transparent cover; the first camera, the main board and the first motor are all located within the first waterproof sealing cavity, the first image collecting hole is communicated with the first waterproof sealing cavity and is blocked by the first transparent cover, enabling the first camera to collect an image of an external object through the first transparent cover.

In one embodiment, the first camera housing comprises a first bottom shell and a first shell cover; the first bottom shell and the first shell cover are sealingly connected to form a first waterproof sealing cavity, the first image collecting hole is opened in the first bottom shell or the first shell cover.

In one embodiment, there are a plurality of the first cameras, which are sequentially distributed along an arc in a first plane.

In one embodiment, the second camera housing has a second waterproof sealing cavity, a second image collecting hole and a second transparent cover; the second camera and the second motor are both located within the second waterproof sealing cavity; the second image collecting hole is communicated with the second waterproof sealing cavity and is blocked by the second transparent cover, enabling the second camera to collect an image of an external object through the second transparent cover.

In one embodiment, the first camera housing has a concave rotating disc insertion hole, the rotating disc is completely inserted into the rotating disc insertion hole and is rotatably connected to the first camera housing.

In one embodiment, the first camera housing is gun-shaped, and the second camera housing is spherical.

In one embodiment, there are two rotating brackets, which are respectively provided on two sides of the second camera housing and are both rotatably connected to the second camera housing. The axes of rotation of the rotating disc and the second camera housing are perpendicular to each other.

The combined camera includes a first camera housing inside which a first camera is provided. One side of the first camera housing is provided with a rotating disc that is rotatable relative to the first camera housing; a rotating bracket is fixed on the rotating disc, a second camera housing that is rotatable relative to the rotating bracket is provided on the rotating bracket, and a second camera is provided within the second camera housing. Obviously, the second camera housing of the combined camera directly is rotated with the first camera housing through both the rotating disc and the rotating bracket, thereby eliminating the mounting bracket and the base in the existing combined camera of a gun-ball linkage structure, thus simplifying the overall structure and reducing its height dimension.

BRIEF DESCRIPTION OF THE DRAWINGS

The accompanying drawings of the description, which form a part of the present application, are used to provide a further understanding of the application. The illustrative embodiments of the application and the description thereof are used to explain the application and do not constitute undue restrictions on the present application. In the figures.

wherein, the correspondence between each component name and the corresponding reference number in FIG. 1 is.

1 first camera, 2 second camera, 3 mounting bracket;

the correspondence between each component name and the corresponding reference number in FIG. 2-FIG. 5 is:

10 first camera housing, 1a first waterproof sealing cavity, 101 first bottom shell, 102 first shell cover, 103 first transparent cover, 10a first rotating disc insertion hole;

11 first camera, 12 first motor, 13 first driving synchronous pulley, 14 first driven synchronous pulley, 15 first synchronous belt;

20 second camera housing, 2a second waterproof sealing cavity, 201 second bottom shell, 202 second shell cover, 203 second transparent cover;

21 second camera, 22 second motor, 24 second driven synchronous pulley, 25 second synchronous belt;

30 rotating disc;

40 left rotating bracket;

41 right rotating bracket;

50 connecting wire;

60 main board.

DETAILED DESCRIPTION

It should be noted that the embodiments in the present application and the features in the embodiments may be combined with each other without conflict. The present application will be described in detail below with reference to the accompanying drawings in conjunction with the embodiments.

Figure 1:
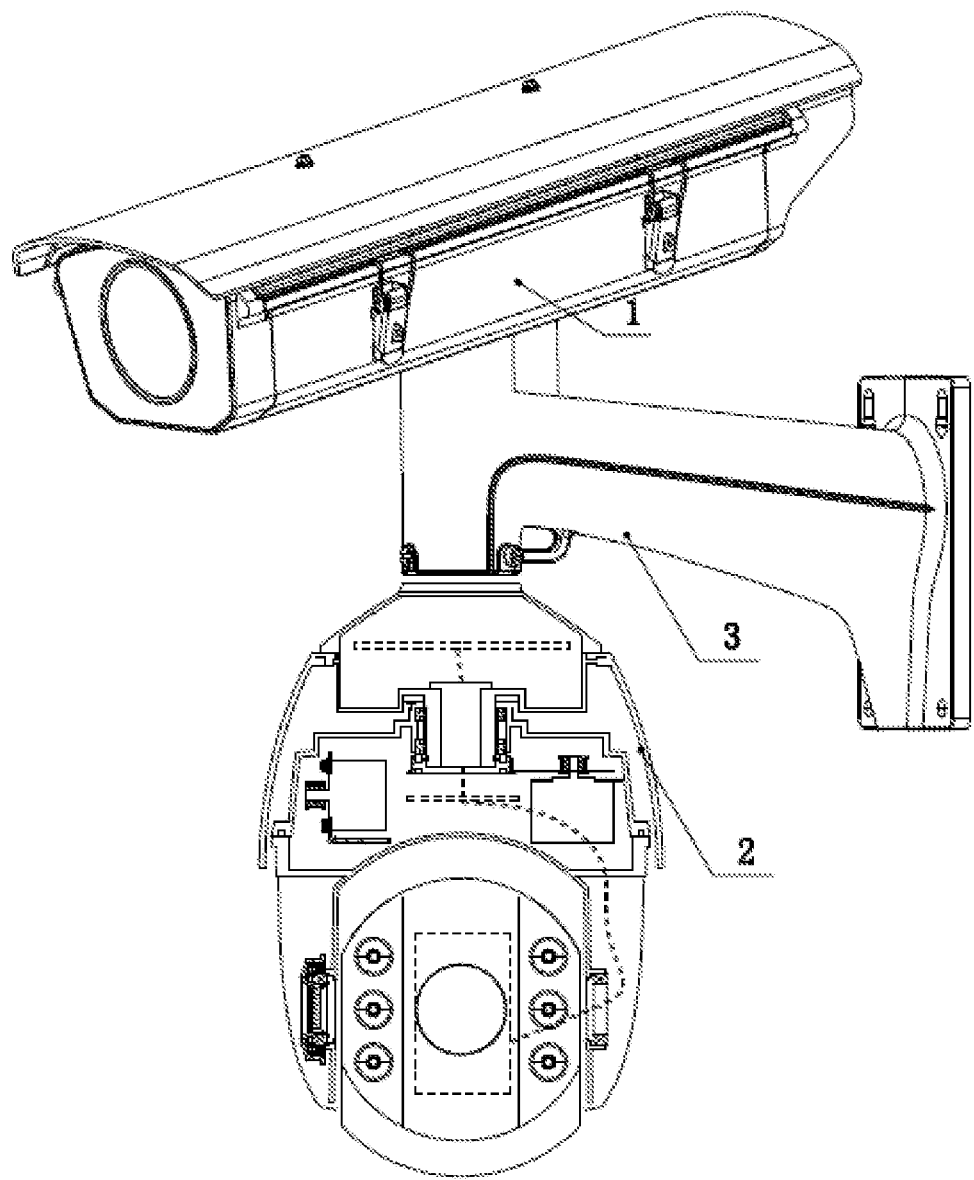
FIG. 1 is a schematic structural view of a combined camera of a gun-ball linkage structure.
Figure 2:
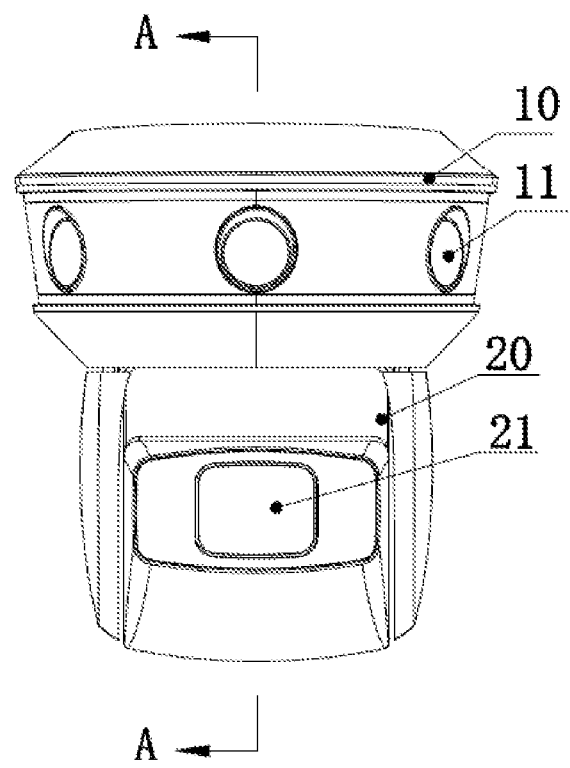
FIG. 2 is a schematic front view showing the structure of a combined camera provided by the present application.
Figure 3:
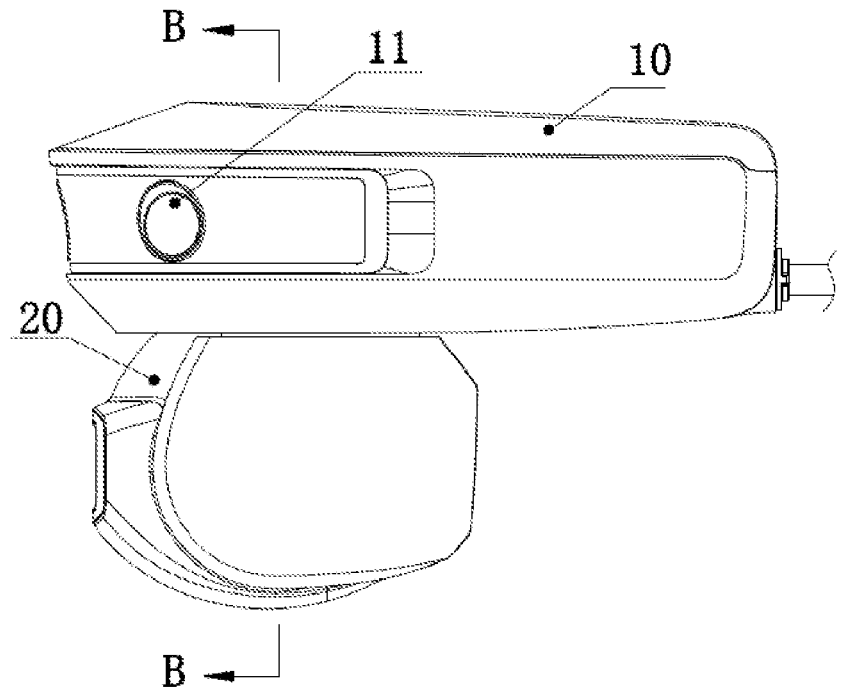
FIG. 3 is a schematic right view showing the structure of the combined camera shown in FIG. 2.
Figure 4:
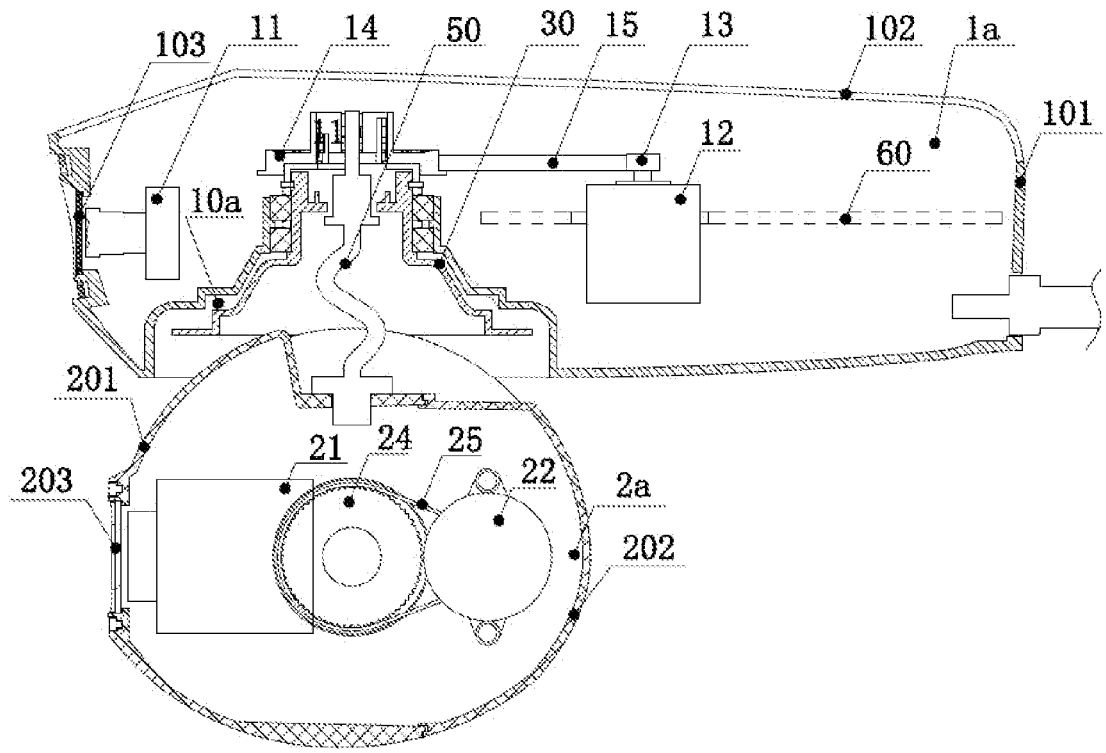
FIG. 4 is a schematic cross-sectional structural view taken along line A-A of FIG. 2.
Figure 5:
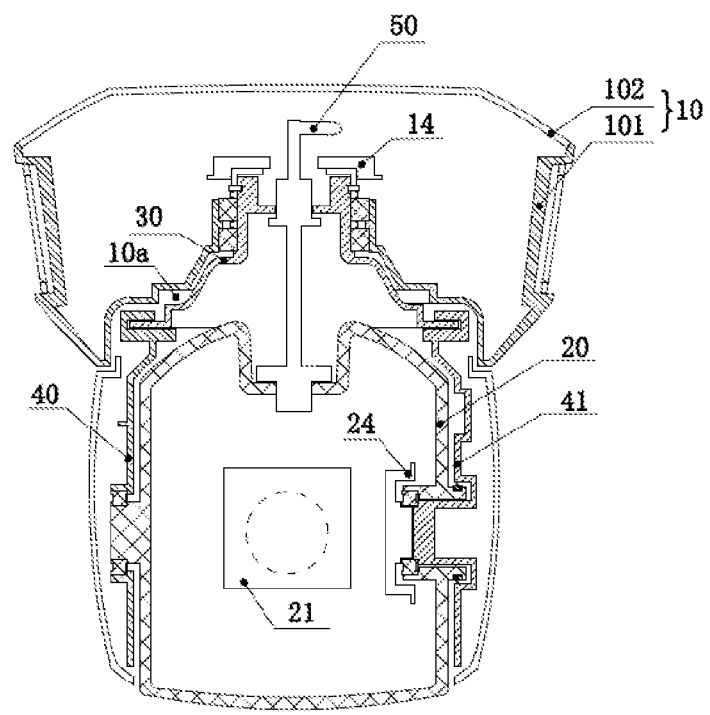
FIG. 5 is a schematic cross-sectional structural view taken along line B-B of FIG. 3.

Referring to FIG. 2 to FIG. 5, FIG. 2 is a schematic front view showing the structure of a combined camera provided by the present application, FIG. 3 is a schematic right view showing the structure of the combined camera as shown in FIG. 2, FIG. 4 is a schematic cross-sectional structural view taken along line A-A of FIG. 2, and FIG. 5 is a schematic cross-sectional structural view taken along line B-B of FIG. 3.

Referring to FIG. 2 to FIG. 5, the combined camera provided by a specific embodiment of the application includes a first camera housing 10 inside which a first camera 11 is provided. One side of the first camera housing 10 is provided with a rotating disc 30 that is rotatable relative to the first camera housing 10. A rotating bracket is fixed on the rotating disc 30, a second camera housing 20 that is rotatable relative to the rotating bracket is provided on the rotating bracket, and a second camera 21 is provided within the second camera housing 20.

It should be noted that, in this embodiment, the rotation axes of the rotating disc 30 and the second camera housing 20 are perpendicular to each other in different planes, and are distinguished here by horizontal and vertical. That is, the rotating disc 30 rotates in a horizontal plane with respect to the first camera housing 10, and the second camera housing 20 rotates in a vertical plane with respect to the rotating bracket.

Of course, the rotation axes of both the rotating disc 30 and the second camera housing 20 may intersect, as long as monitoring requirements on the combined camera can be satisfied. The specific angle is set by those skilled in the art according to the actual structure.

In detail, the first camera housing 10 has a concave rotating disc insertion hole 10a. The rotating disc 30 is completely inserted into the rotating disc insertion hole 10a and directly connected to the first camera housing 10 through a bearing. The first drive mechanism drives the rotating disc 30 to rotate in a horizontal plane relative to the first camera housing 10.

Preferably, in the specific embodiment, the first drive mechanism comprises a first motor 12 and a first synchronous belt transmission mechanism. Wherein, the first motor 12 is fixedly mounted within the first camera housing 10, and the first synchronous belt transmission mechanism includes a first driving synchronous pulley 13, a first driven synchronous pulley 14, and a first synchronous belt 15. The first driven synchronous pulley 14 is coaxially and fixedly connected to the rotating disc 30. The first driving synchronous pulley 13 is coaxially and fixedly connected to the electrical pivot of the first motor 12, and the first synchronous belt 15 is engaged with the first driving synchronous pulley 13 and the first driven synchronous pulley 14 to tension the internal teeth.

That is, the first motor 12 drives the rotating disc 30 to rotate in a horizontal plane with respect to the first camera housing 10 by the first synchronous belt transmission mechanism. The rotating disc 30 is fixedly connected to the rotating bracket, to which the second camera housing 20 is directly rotatably connected, and the second camera 21 is fixed to the second camera housing 20. Therefore, the rotation of the rotating disc 30 relative to the first camera housing 10 in the horizontal plane can drive the second camera 21 to rotate simultaneously to adjust the monitoring angle of the second camera 21 in the horizontal plane.

With continued reference to FIG. 4 and FIG. 5, there are two rotating brackets, which are respectively provided on two sides of the second camera 21. In order to facilitate the understanding of the specific structure of such a camera by those skilled in the art, the two rotating brackets are distinguished here by orientation words. The orientation words, left and right, are defined on the basis of the second camera housing 21 in FIG. 4. That is to say, of the two rotating brackets, the left rotating bracket 40 is located on the left side of the second camera housing 21, and the right rotating bracket 41 is located on the right side of the second camera housing 21. The second camera housing 20 is rotatably connected to the left rotating bracket 40 and right rotating bracket 41 by bearings.

In detail, the left rotating bracket 40 has a bracket bearing hole, and the right rotating bracket has a bracket rotating shaft. The second camera housing 20 has a second camera housing bearing hole and a second camera housing rotating shaft. The bracket bearing hole, the bracket rotating shaft, the second camera housing bearing hole and the second camera housing rotating shaft are concentrically arranged. The left rotating bracket 40 and the second camera housing 20 are rotatably connected by a bearing mounted between the bracket bearing hole and the second camera housing rotating shaft. The right rotating bracket 41 and the second camera housing 20 are rotatably connected by a bearing mounted between the second camera housing bearing hole and the bracket rotating shaft. The second drive mechanism drives the second camera housing 20 to rotate in a horizontal plane with respect to the left and right rotating brackets 40, 41.

Similarly, in the specific embodiment, the second drive mechanism comprises a second motor 22 and a second synchronous belt transmission mechanism. Wherein, the second motor 22 is fixedly mounted within the second camera housing 20, and the second synchronous belt transmission mechanism includes a second driving synchronous pulley (not shown in the figures), a second driven synchronous pulley 24, and a second synchronous belt 25. The second driven synchronous pulley 24 is coaxially and fixedly connected to the bracket rotating shaft. The second driving synchronous pulley is coaxially and fixedly connected to the electrical pivot of the second motor 22. The second synchronous belt 25 is engaged with the second driving synchronous pulley and the second driven synchronous pulley 24 to tension the internal teeth.

That is, the second motor 22 drives the second camera housing 20 to rotate in a vertical plane by the second synchronous belt transmission mechanism. Moreover, the second camera 21 is fixed to the second camera housing 20. Therefore, the rotation of the rotating disc 30 relative to the first camera housing 10 in the vertical plane can drive the second camera 21 to rotate to adjust the monitoring angle of the second camera 21 in the vertical plane.

Obviously, the second camera housing 20 of the combined camera is directly rotatably connected to the first camera housing 10 through both the rotating disc 30 and the rotating bracket, thereby eliminating the mounting bracket and the base in the existing combined camera of a gun-ball linkage structure, thus simplifying the overall structure and reducing its height dimension in the vertical direction.

In addition, compared to the prior art, the first motor 12 and the second motor 22 are respectively provided within the first camera housing 10 and the second camera housing 20, so that the overall structure is simplified to a certain extent and the vertical dimension is reduced. Moreover, synchronous belt transmission mechanisms are used as the first transmission mechanism and the second transmission mechanism, so that the combined camera has a compact overall structure and a stable transmission. Of course, the second transmission mechanism and the first transmission mechanism may also be a gear transmission mechanism, a sprocket transmission mechanism, or the like, as long as the requirements of the deceleration function and the assembly process are satisfied.

Further, with continued reference to FIG. 4 and FIG. 5, the main board 60 of the combined camera is integrated with a power supply module, a core switching module, and a pan/tilt head module. Wherein, the power supply module is used to supply power to the first camera 11, the second camera 21, the first motor 12, and the second motor 22. The pan/tilt head module is used to control the first motor 12 and the second motor 22, and the core switching module is used for signal switching between the first camera 11, the second camera 21 and a console (specifically including network, BNC, 485, uart, etc.).

In addition, the combined camera further includes a connecting wire 50, which is electrically connected to the main board 60 at one end, and is extended, at the other end, through the first camera housing 10, the rotating disc 30 and into the second camera housing 20, and electrically connected to the second camera 21 and the second motor 22.

It is conceivable that compared to the combined camera combined with the first camera and the second camera in the prior art, the combined camera in this embodiment adopts a main board 60, which is integrated with a plurality of functional modules and supplies and controls both the first camera 11 and the second camera 21, greatly simplifying the structure thereof.

Preferably, with continued reference to FIG. 4 and FIG. 5, the first camera housing 10 is a cylindrical housing. The first camera 11, the rotating disc 30 and the first motor 12 are sequentially arranged along the length direction of the first camera housing 10, and the main board 60 is arranged along the length direction of the first camera housing 10.

In this way, the structure of the combined camera is compact and reasonable, which can further define the height dimension of the combined camera in the vertical direction.

In addition, in the embodiment, there are three first cameras 11, which are sequentially distributed along an arc to acquire a first image of a monitoring area. It can be understood that the setting of the number of the first cameras 11 as three is illustrative only, and a person skilled in the art can determine an appropriate number of first cameras 11 according to actual monitoring requirements. That is, any number of the first cameras 11 are included within the protection scope of the present application.

Furthermore, as can be seen in conjunction with FIGS. 4 and 5, the first camera housing 10 and the second camera housing 20 are both waterproof sealing housings, such that the functional components such as the first camera 11, the second camera 21 and the main board 60 are sealingly mounted, so that the combined camera has a certain waterproof function, and then the scope of application thereof is expanded.

In detail, the first camera housing 10 has a first waterproof sealing cavity 1a, a first image collecting hole and a first transparent cover 103. The first camera 11, the main board 60 and the first motor 12 are all located within the first waterproof sealing cavity 1a. The first image collecting hole is communicated with the first waterproof sealing cavity 1a and is blocked by the first transparent cover 103, enabling the first camera 11 to collect an image of an external object through the first transparent cover 103.

In more detail, the first camera housing 10 includes a first bottom shell 101 and a first shell cover 102. Wherein, the first bottom shell 101 and the first shell cover 102 are sealingly connected to form the first waterproof sealing cavity 1a. The first camera 11 is fixed within the first waterproof sealing cavity 1a, and the first image collecting hole is opened in the first bottom shell 101 or the first shell cover 102.

Similarly, the second camera housing 20 has a second waterproof sealing cavity 2a, a second image collecting hole and a second transparent cover 203. Wherein, the second camera 21 and the second motor 22 are both located within the second waterproof sealing cavity 2a. The second image collecting hole is communicated with the second waterproof sealing cavity 2a and is blocked by the second transparent cover 203, enabling the second camera 21 to collect an image of an external object through the second transparent cover 203.

More specifically, the second camera housing 20 includes a second bottom shell 201 and a second shell cover 202. Wherein, the second bottom shell 201 and the second shell cover 202 are sealingly connected to form the second waterproof sealing cavity 2a, and the second image collecting hole is opened in the second bottom shell 201 or the second shell cover 202.

With continued reference to FIG. 2 and FIG. 3, in the present embodiment, the first camera housing 10 is gun-shaped, and the second camera housing 20 is spherical.

The above description is only the preferred embodiments of the present application, and is not intended to limit the present application. Various changes and modifications may be made by a person skilled in the art in the present application. Any amendments, equivalent substitutions, improvements etc. made within the spirit and principle of the present application are all included in the protection scope of the present application.

The invention claimed is:

1. A combined camera, comprising a first camera housing (10) inside which a first camera (11) is provided, wherein one side of the first camera housing (10) is provided with a rotating disc (30) that is rotatable relative to the first camera housing (10); a rotating bracket is fixed on the rotating disc (30), a second camera housing (20) that is rotatable relative to the rotating bracket is provided on the rotating bracket, and a second camera (21) is provided within the second camera housing (20), wherein the combined camera further comprises a first motor (12), and the first motor (12) is fixed within the first camera housing (10) and is configured to drive the rotating disc (30) to rotate relative to the first camera housing (10), and wherein the first camera (11), the rotating disc (30) and the first motor (12) are sequentially arranged along a length direction of the first camera housing (10).

2. The combined camera of claim 1, further comprising a second motor (22), the second motor (22) is fixed within the second camera housing (20) and is configured to drive the second camera housing (20) to rotate relative to the rotating bracket.

3. The combined camera of claim 2, further comprising a main board (60), which is integrated with a power supply module, a pan/tilt head module and a core switching module, and is fixedly mounted within the first camera housing (10).

4. The combined camera of claim 3, further comprising a connecting wire (50), which is electrically connected to the main board (60) at one end, and is extended, at the other end, through the first camera housing (10), the rotating disc (30) and into the second camera housing (20), and electrically connected to the second camera (21) and the second motor (22).

5. The combined camera of claim 3, wherein, the first camera housing (10) is a cylindrical housing, and the main board (60) is arranged along a length direction of the first camera housing (10).

6. The combined camera of claim 3, wherein, the first camera housing (10) has a first waterproof sealing cavity (1a), a first image acquisition hole and a first transparent cover (103); the first camera (11), the main board (60) and the first motor (12) are all located within the first waterproof sealing cavity (1a), the first image acquisition hole is communicated with the first waterproof sealing cavity (1a) and is blocked by the first transparent cover (103), enabling the first camera (11) to acquire an image of an external object through the first transparent cover (103).

7. The combined camera of claim 6, wherein, the first camera housing (10) comprises a first bottom shell (101) and a first shell cover (102); the first bottom shell (101) and the first shell cover (102) are sealingly connected to form the first waterproof sealing cavity (1a), the first image acquisition hole is opened in the first bottom shell (101) or the first shell cover (102).

8. The combined camera of claim 6, wherein, there are a plurality of first cameras (11), which are sequentially distributed along an arc.

9. The combined camera of claim 3, wherein, the second camera housing (20) has a second waterproof sealing cavity (2a), a second image acquisition hole and a second transparent cover (203); the second camera (21) and the second motor (22) are both located within the second waterproof sealing cavity (2a), the second image acquisition hole is communicated with the second waterproof sealing cavity (2a) and is blocked by the second transparent cover (203), enabling the second camera (21) to acquire an image of an external object through the second transparent cover (203).

10. The combined camera of claim 1, wherein, the first camera housing (10) has a concave rotating disc insertion hole (10a), the rotating disc (30) is completely inserted into the rotating disc insertion hole (10a) and is rotatably connected to the first camera housing (10).

11. The combined camera of claim 1, wherein, the first camera housing (10) is gun-shaped, and the second camera housing (20) is spherical.

12. The combined camera of claim 1, wherein, there are two rotating brackets, which are respectively provided on two sides of the second camera housing (20) and are both rotatably connected to the second camera housing (20), the axes of rotation of the rotating disc (30) and the second camera housing (20) are perpendicular to each other.

* * * * *